United States Patent [19]

Hollaender et al.

[11] 4,188,679

[45] Feb. 19, 1980

[54] ANNULAR SHAPED BUOYANCY ELEMENT FOR TRANSPORT HOSES

[75] Inventors: Fritz Hollaender, Hamburg; Klaus Schneider, Hausbruch, both of Fed. Rep. of Germany

[73] Assignees: Phoeniz AG, Hamburg; Eddelbuttel & Schneider, Grenzkehre, both of Fed. Rep. of Germany

[21] Appl. No.: 847,293

[22] Filed: Oct. 31, 1977

[30] Foreign Application Priority Data

Oct. 30, 1976 [DE] Fed. Rep. of Germany ....... 2649960

[51] Int. Cl.² .............................................. B63B 21/52
[52] U.S. Cl. ................................................................ 9/8 R
[58] Field of Search .................. 9/8 R, 8 P, 340, 345, 9/400; 4/172, 172.15, 172.16, 172.17; 138/103; 174/101.5; 272/1 B; 61/1 F; 405/23, 26, 27, 28

[56] References Cited

U.S. PATENT DOCUMENTS

| | | | |
|---|---|---|---|
| 3,597,779 | 8/1971 | Morgan | 9/8 R |
| 3,616,475 | 11/1971 | Lewis | 9/340 |
| 3,757,370 | 9/1973 | Seno et al. | 9/8 R |

FOREIGN PATENT DOCUMENTS

| | | | |
|---|---|---|---|
| 831755 | 3/1960 | United Kingdom | 174/101.5 |
| 1141425 | 1/1969 | United Kingdom | 9/8 R |

*Primary Examiner*—Charles E. Frankfort
*Attorney, Agent, or Firm*—Allison C. Collard; Thomas M. Galgano

[57] ABSTRACT

An annular-shaped buoyancy element for transport hoses which are used on water includes two generally semicircular-shaped buoyancy members, each of which includes a core made of foam plastic material completely encased in a sheath made of polymer material. Each of the semicircular members having coupling means mounted on each of the end faces thereof for coupling the members together. The members also have in a relaxed condition thereof, a radially extending V-shaped groove formed in its interior face, adjacent to the center thereof.

10 Claims, 3 Drawing Figures

ANNULAR SHAPED BUOYANCY ELEMENT FOR TRANSPORT HOSES

BACKGROUND OF THE INVENTION

This invention relates to an annular-shaped buoyancy element for transport hoses which are used on water. More particularly, it relates to such an element which includes two semicircular parted buoyancy members which are hingeably coupled to one another, and which are fabricated from a core material of foam material enclosed in a sheath made of polymer material.

Unitary buoyancy elements are known which encompass or surround, and support transport hoses on water. However, these conventional buoyancy elements are disadvantageous in that when the buoyancy element is damaged or destroyed or if the hose is damaged or destroyed a replacement of either of these parts is not possible.

Buoyancy elements having a plurality of parts in the form of semicircular shells are also known. However, they have a number of disadvantages with respect to the unitary elements. These semicircular elements are usually held in space by means of outside clamps, bands or the like and form annular-like elements. The hitherto known elements must either be made of soft elastic parts or must be mounted onto the hose spaced apart from each other, so as to permit a defined bending of the hose. The soft elastic elements which consist of locked cell foams can absorb undefined quantities of water and therefore diminish the devices floating capabilities. Furthermore, these elements are easily damaged. In another known embodiment, rigid semicircular shells are used which are held at spaced-apart locations by means of elastic intermediary parts, so that a certain movability of the hose is generated.

Finally, a buoyancy element for hoses is known from German Laid Open Pat. No. 2,004,007, which essentially has a structure as mentioned before. However, this buoyancy element is also disadvantageous with respect to mounting onto the hose, because a number of additional undertakings are required, whereby these elements are subject to damage after long-time use, so that the hose must be held by additional rings around the hose.

It is therefore an object of the invention to provide a buoyancy element of the aforementioned type which eliminates the disadvantages of the known prior art and which is advantageous with respect to simple mounting, long life and very good adaptability to the transport (feeding) hose.

SUMMARY OF THE INVENTION

These and other related objects are attained in accordance with the present invention by the provision of swivel connections between the separating faces or ends of the semicircular shells. Preferably, the swivel connections are spaced inwardly from the outer circumferential face of the shell. The separating faces are inclined with respect to each other in such a manner that two rings coupled together at one end may be spread apart wide enough for permitting a mounting on the hose. The ring, when seen in its cross section and, in its slack or relaxed condition, is provided with an inside deep, radially-running, annular V-shaped groove in the center zone of the interior face of the ring.

The ring elements should be mounted onto the hose in abutting relationship without pretension. The V-shaped, inner annular groove closes during bending of the feeding hose and thereby limits the possible bending angle of the hose. Therefore, the angle formed by the annular groove is selected relative to the ring size and the required hose flexibility (mobility). Thereby, this ensures that the rings stay in contact at each deforming phase of the hose which prevents a folding of the feeding hose. In order to enable a deforming in the V-shaped groove, it is necessary that the material forming the bottom of the annular groove be elastic to ensure that this zone is a bendable joint and that the material stresses be kept low.

Preferably, the sheath consists of glass fiber-strengthened polyester resin which is resistant to ocean water. The ring core consists of hard closed pore cell material, which has a relatively high degree of hardness and is hydrolysis-resistant, while having a low density. This material for the sheath should be so chosen that the buoyancy element is elastically deformable. This assures that even if the sheath is damaged, no large quantities of water can penetrate into the structure (due to the closed pore cells of the core material). The front faces of the buoyancy element have such a conicity that the conicity is maintained despite axial stress, closing of annular groove or folding of the hose and such that the front faces of adjacent rings remain in snug or tight engagement with each other.

The inner engaging wall faces of the ring must be conically or spherically shaped with respect to the axial ring direction at both sides of the front faces. This results in that the ring engages the hose only with a small annular surface or zone portion which, in its normal position, is sufficient to maintan the rings' centrical position.

When the rings are clamped on one side, the annular groove maintains this conicity or sphericality, so that it adapts to the inner bend of the folded hose. The height/width ratio is defined by the required buoyancy force and the distance between the end abutments, where the rings are in contacting engagement (the rings requiring a higher degree of buoyancy in the zone of coupling). To simplify the mounting of the ring portions on the hose, the coupling means of the semi-circular rings should be in the form of joints, whereby the joint plates should be provided on both sides of the inner groove, which provides a complete flexibility of the inner groove in axial direction of the inner groove. The joint plates are unitary pieces and are made with special reinforcements from the sheath material.

Other objects and features of the present invention will become apparent from the following detailed description considered in connection with the accompanying drawing, which discloses the embodiments of the invention. It is to be understood, however, that the drawing is designed for the purpose of illustration only, and not as a definition of the limits of the invention.

BRIEF DESCRIPTION OF THE DRAWINGS

In the drawing, wherein similar reference characters denote similar elements throughout the several views.

DETAILED DESCRIPTION OF THE PREFERRED EMBODIMENT

Figure 1:
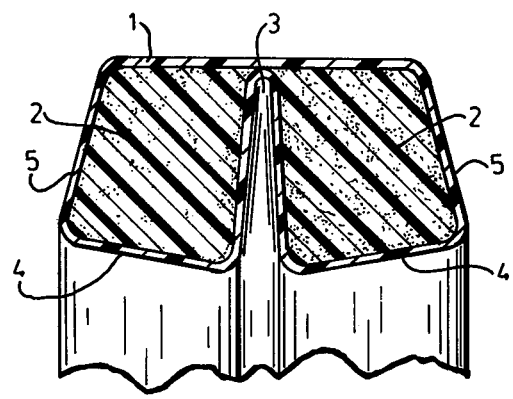
FIG. 1 is a fragmentarily illustrated, cross-sectional view of a buoyancy element embodying the invention.

Referring now in detail to the drawings, FIG. 1 shows a cross section through the half of an annular-like hose buoyancy element, having the glass fiber-reinforced plastic outer skin 1, a hard foam filling 2, and an elastically-operating annular groove 3. The interior face 4 of the element is contoured to permit a possible hose bending. The element is provided with conically-shaped front faces 5, to permit a smooth engagement of the individual front faces 5 during hose bending.

Figure 2:
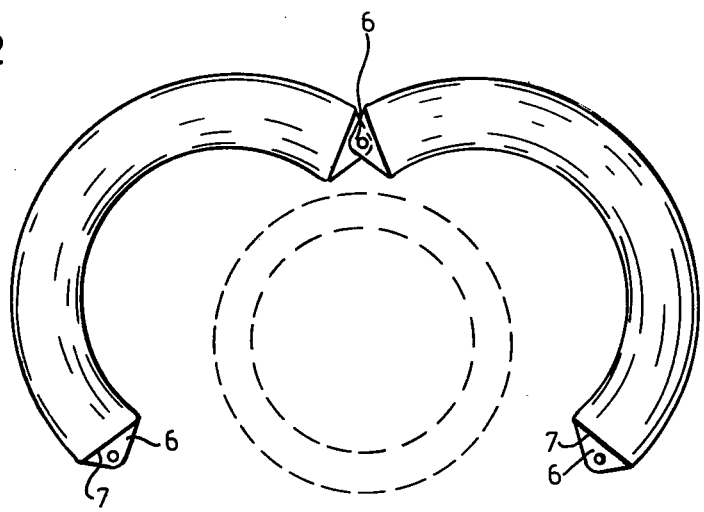
FIG. 2 is a side elevational view of the buoyancy element shown in FIG. 1, showing the coupling of two rings together.

FIG. 2 shows two semicircular shells which are connected at one side with hinges 6, comprising triangular flaps extending from each end thereof, which are provided with bores and which, when superimposed, may be locked together by means of a bolt. The elements at the hinge point have conically-shaped end faces 7, so that the two shells, coupled at one side, may be opened wide enough to permit mounting on the hose and a subsequent coupling of the oppositely-arranged hinge points.

Figure 3:
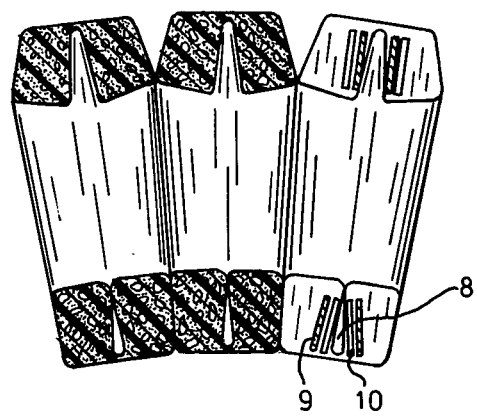
FIG. 3 is a sectional view, in part elevation of a plurality of buoyancy elements mounted on a bent hose.

FIG. 3 shows a sectional view of the bent hose with maximally-deformed floating elements. As can be seen at 8, despite a complete closing of the groove, it does not interfere with the engagement of the joint plates 9 in the joint slot 10 of the coupled rings.

In particular, as seen clearly in FIG. 3, each of the semicircular shells may be provided with a pair of joint plates 9 extending outwardly from each of the end faces thereof and which are disposed on opposite sides of the V-shaped groove. The shells also have a pair of joint slots 10 formed on each of the end faces on opposite sides of the V-shaped groove, each of which is disposed and configured for receipt therein of a joint plate 9 of an opposing and abutting end face of the member to be coupled thereto.

As can also be seen from a comparison of the upper and lower portions of the semicircular shells in FIG. 3, in a relaxed state the generally V-shaped, radially-extending groove 3 opening onto the interior face 4, adjacent to the center thereof, is defined by a pair of opposed flexible wall portions which, in effect, define at the base of the groove a yieldable joint. The yieldable joint permits, in a compressed state, the movement of the wall portions into at least partial abutment with one another so as to close the groove 3.

While only one embodiment of the present invention has been shown and described, it will be obvious that many changes and modifications may be made thereunto, without departing from the spirit and scope of the invention.

What is claimed is:

1. An annular-shaped buoyancy element for transport hoses which are used on water, comprising:
   two generally semicircular-shaped buoyancy members, each of which includes a core made of foam plastic material, completely encased in a sheath made of polymer material, a pair of end faces and coupling means mounted on each of said end faces thereof to permit said members to be coupled together in which coupled condition they cooperate to define said annular-shaped buoyancy element, each of said members also having a radially interior face and a pair of opposed flexible wall portions which, in a relaxed state, define therebetween a generally V-shaped, radially-extending groove opening onto said interior face, adjacent to the center thereof, said wall portions defining at the base of said groove a yieldable joint which permits in a compressed state, the movement of said wall portions into at least partial abutment with one another so as to close said groove.

2. The buoyancy element according to claim 1, wherein said coupling means comprise flexible coupling elements.

3. The buoyancy element according to claim 2, wherein said coupling means comprise a pair of joint plates extending outwardly from each of said end faces thereof and which are disposed on opposite sides of said V-shaped groove and a pair of joint slots formed in each of said end faces on opposite sides of said V-shaped groove, each of which is disposed and configured for receipt therein of a joint plate of an opposing and abutting end face of the other member to be coupled thereto.

4. The buoyancy element according to claim 1, wherein said groove separates said interior face into two interior face portions and wherein said interior face portions are frustoconically-shaped, said frustoconically-shaped face portions tapering inwardly toward one another.

5. The buoyancy element according to claim 1, wherein said interior faces of said members in cross section are provided with a conicity adapted to the bending of the hose, such that the entire surface of said interior faces of said members will contact the hose when in a bent position.

6. The buoyancy element according to claim 1 wherein said coupling means are shaped as hinges.

7. The buoyancy element according to claim 1 wherein coupling means are mounted on said end faces spaced inwardly from the outer and inner edges thereof.

8. The buoyancy element according to claim 1 wherein said end faces of said semicircular members are inclined with respect to each other and are radially outwardly tapered.

9. The buoyancy element according to claim 1 wherein the interior diameter of the coupled semicircular-shaped members is wider than the outer diameter of the hose.

10. The buoyancy element according to claim 1, wherein each of said buoyancy members has a radially exterior face and a pair of fruustoconically shaped lateral faces which join said exterior face to said interior face, said exterior face having a width which is less than the width of said interior face.

* * * * *